US012803954B2

(12) United States Patent
Liang

(10) Patent No.: US 12,803,954 B2

(45) Date of Patent: Nov. 17, 2026

(54) STORING MAC ADDRESS TABLE ENTRIES

(71) Applicant: NEW H3C TECHNOLOGIES CO., LTD., Zhejiang (CN)

(72) Inventor: Xuewei Liang, Beijing (CN)

(73) Assignee: NEW H3C TECHNOLOGIES CO., LTD., Zhejiang (CN)

(*) Notice: Subject to any disclaimer, the term of this patent is extended or adjusted under 35 U.S.C. 154(b) by 29 days.

(21) Appl. No.: 19/132,992

(22) PCT Filed: Mar. 31, 2023

(86) PCT No.: PCT/CN2023/085507
§ 371 (c)(1),
(2) Date: May 27, 2025

(87) PCT Pub. No.: WO2024/197825
PCT Pub. Date: Oct. 3, 2024

(65) Prior Publication Data

US 2026/0075035 A1 Mar. 12, 2026

(51) Int. Cl.
*H04L 61/5046* (2022.01)
*H04L 45/00* (2022.01)
(Continued)

(52) U.S. Cl.
CPC .......... *H04L 61/5046* (2022.05); *H04L 45/54* (2013.01); *H04L 45/745* (2013.01); *H04L 2101/622* (2022.05)

(58) Field of Classification Search
CPC ....... G06F 16/2255; H04L 61/00; H04L 9/14; H04L 9/3242; H04L 61/09; H04L 61/58;
(Continued)

(56) References Cited

U.S. PATENT DOCUMENTS 5,542,087 A * 7/1996 Neimat ............... G06F 16/9014
2009/0113152 A1* 4/2009 Eguchi ................ G06F 11/1451
711/171

(Continued)

FOREIGN PATENT DOCUMENTS

CN 115065662 A1 * 7/2009 ......... H04L 61/3005
CN 101604337 A 12/2009

(Continued)

OTHER PUBLICATIONS

European Patent Office, Extended European Search Report Issued in Application No. 23929410.1, Dec. 2, 2025, Germany, 11 pages.

(Continued)

*Primary Examiner* — Schquita D Goodwin
*Assistant Examiner* — Linh T. Nguyen
(74) *Attorney, Agent, or Firm* — GREENBLUM & BERNSTEIN, P.L.C.

(57) ABSTRACT

A method for storing MAC address table entries includes: acquiring a learned MAC address table entry; computing a first storage position of the MAC address table entry in each storage block; determining that each first storage position stores a first conflict MAC address table entry; on the basis of a maximum recursion depth and a preset recursive traversal algorithm, performing traversal in all the storage blocks for a migratable storage position of each first conflict MAC address table entry; locating one or more migratable storage positions of one or more of the first conflict MAC address table entries in all the storage blocks; selecting one located migratable storage position, and performing table entry migration for the first conflict MAC address table entry corresponding to the selected migratable storage position; and storing the MAC address table entry into the first storage position of the migrated first conflict MAC address table entry.

15 Claims, 5 Drawing Sheets

(51) Int. Cl.
*H04L 45/745* (2022.01)
*H04L 101/622* (2022.01)

(58) Field of Classification Search
CPC ... H04L 61/5046; H04L 45/54; H04L 45/745; H04L 45/7453
See application file for complete search history.

(56) References Cited

U.S. PATENT DOCUMENTS

| | | | | |
|---|---|---|---|---|
| 2019/0238459 | A1* | 8/2019 | Shmilovici | H04L 45/748 |
| 2019/0332300 | A1* | 10/2019 | Singh | G06F 16/2255 |
| 2024/0028560 | A1 | 1/2024 | Chen et al. | |

FOREIGN PATENT DOCUMENTS

| | | | | |
|---|---|---|---|---|
| CN | 102880628 | A | 1/2013 | |
| CN | 102880628 | A1 * | 1/2013 | G06F 17/30 |
| CN | 102880724 | A | 1/2013 | |
| CN | 103001878 | A | 3/2013 | |
| CN | 102880628 | B | 2/2015 | |
| CN | 112491725 | A | 3/2021 | |
| CN | 113094336 | A | 7/2021 | |
| EP | 2314027 | B1 | 5/2012 | |
| TW | 200519618 | A | 6/2005 | |
| WO | 2018099107 | A1 | 6/2018 | |
| WO | 2018/120109 | A1 | 7/2018 | |
| WO | 2022205544 | A1 | 10/2022 | |

OTHER PUBLICATIONS

State Intellectual Property Office of the People's Republic of China, Office Action and Search Report Issued in Application No. 2023800085577, Sep. 26, 2025, 15 pages.

Chen Rui et al., Data Structure, Chapter 7, Hefei University of Technology Press, p. 271-273, Jun. 30, 2012.

International Search Report issued in WIPO Patent Application No. PCT/CN2023/085507, dated Dec. 5, 2023, along with an English translation thereof.

State Intellectual Property Office of the People's Republic of China, Office Action and Search Report Issued in Application No. 2023800085577, Mar. 17, 2026, 18 pages.

Leifeng Bu, "TypeScript Graphics Rendering in Practice: 3D Architecture and Implementation Based on WebGL", China Machine Press, pp. 60-62, Jan. 31, 2020.

* cited by examiner

STORING MAC ADDRESS TABLE ENTRIES

CROSS REFERENCE TO RELATED APPLICATIONS

The present disclosure is a National Stage of International Application PCT/CN2023/085507, filed on Mar. 31, 2023, the entire contents of the mentioned application are incorporated herein by reference.

BACKGROUND

A network apparatus may learn a media access control (MAC) address entry based on a source MAC address of a received Ethernet message, and perform hash calculation on a key of the MAC address entry to obtain a hash value indicating a storage position in a hash table. When the storage position indicated by the hash value is free, the MAC address entry is stored at the corresponding position as a data structure (key, value). A hash collision occurs when another MAC address entry is already stored at the storage position indicated by the calculated hash value.

DETAILED DESCRIPTION OF THE EMBODIMENTS

In order to enable those skilled in the art to better understand the technical solutions in embodiments of the present disclosure and to make the above objectives, features, and advantages in the embodiments of the present disclosure more clearly understood, the technical solutions in the embodiments of the present disclosure is described below in further detail in conjunction with the accompanying drawings.

Figure 1:
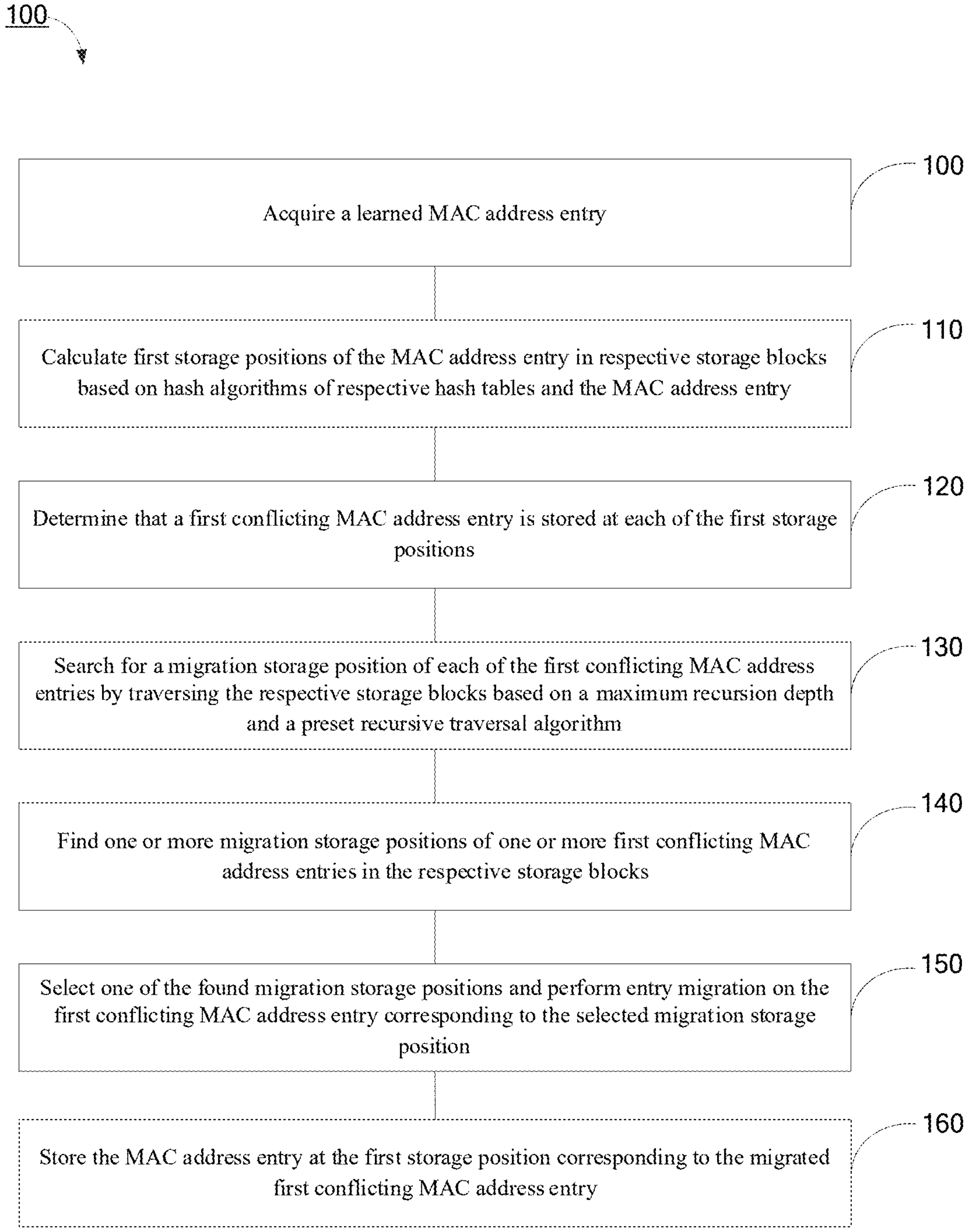
FIG. 1 is a schematic diagram illustrating a method for storing MAC address entries based on an embodiment of the present disclosure.

FIG. 1 is a schematic diagram illustrating a method for storing MAC address entries based on an embodiment of the present disclosure. As shown in FIG. 1, the method for storing MAC address entries may include the following processes 100 to 160.

Process 100, a learned MAC address entry is acquired.

In this embodiment of the present disclosure, a network apparatus, for example, a switching apparatus, may learn the MAC address entry based on a received message.

In a case where the learned MAC address entry is obtained, subsequent processing may be performed by taking the acquired MAC address entry as a currently to-be-stored MAC address entry.

Process 110, first storage positions of the MAC address entry in respective storage blocks are calculated based on hash algorithms of respective hash tables and the MAC address entry.

In this embodiment of the present disclosure, the network apparatus provides a plurality of hash tables to store MAC address entries. Each hash table is stored in a storage block and each storage block is bound to a unique hash algorithm.

For the acquired MAC address entry, a storage position of the MAC address entry in each storage block may be calculated based on a key of the MAC address entry by using the hash algorithms of the hash tables respectively. The storage position may be called the first storage position.

In this embodiment of the present disclosure, the key of the MAC address entry includes a MAC address and a virtual local area network (VLAN), and the key is not used to limit the protection scope of the present disclosure. The key of the MAC address entry stored by the network apparatus based on the above embodiment may alternatively be a MAC address, or a MAC address and a virtual switching instance (VSI) of a VPN, or a MAC address and other information indicating a forwarding domain.

Process 120, it is determined that a first conflicting MAC address entry is stored at each of the first storage positions.

In this embodiment of the present disclosure, in a case where the first storage position of the MAC address entry in each storage block is calculated, it may be determined whether a MAC address entry is stored at each first storage position.

A MAC address entry stored at a first storage position may be called a first conflicting MAC address entry.

In a case where it is determined that the first conflicting MAC address entry is stored at each first storage position, process 130 may be continued.

In this embodiment of the present disclosure, in a case where it is determined that at least one first storage position does not store a first conflicting MAC address entry, a first storage position which is free may be selected to store the acquired MAC address entry.

Process 130, a migration storage position of each of the first conflicting MAC address entries is searched for by traversing the respective storage blocks based on a maximum recursion depth and a preset recursive traversal algorithm.

In this embodiment of the present disclosure, in consideration of the fact that a MAC address entry may correspond to a storage position in each storage block, for a stored MAC address entry, in a case where there is a hash collision between the stored MAC address entry and the currently to-be-stored MAC address entry and the stored MAC address entry has a free storage position in other storage blocks. The stored MAC address entry may be migrated to the corresponding free storage position in the other storage blocks, so that the currently to-be-stored MAC address entry may be successfully stored.

Therefore, for a MAC address entry that cannot be stored due to a hash collision, a success rate of storing the MAC address entry may be increased by trying to migrate the first conflicting MAC address entry stored at the first storage position, thereby increasing a storage rate of the MAC address entry.

Correspondingly, in a case where it is determined that the first conflicting MAC address entry is stored at each of the first storage positions, all of the storage blocks may be traversed to search for a migration storage position of each of the first conflicting MAC address entries.

In this embodiment of the present disclosure, in the process of traversing and searching for migration storage positions, searching for a multi-level migration storage position may be performed.

For example, taking storage of a MAC address entry 1 as an example, the first conflicting MAC address entry is stored at each of first storage positions calculated based on a key of the MAC address entry 1 by using the hash algorithm of each hash table, in the process of traversing and searching for the migration storage positions, whether the first conflicting MAC address entry may be migrated to another storage position may be determined, and whether another MAC address entry that has a hash collision with the first conflicting MAC address entry may be migrated to another storage position may also be determined. A success rate of finding a migration storage position is improved by recursively traversing the migration storage positions.

In this embodiment of the present disclosure, the maximum recursion depth may be flexibly set based on a number of storage positions of the hash tables and a number of hash tables. In this way, the processing of traversing all storage blocks to search for the migration storage positions may not consume an excessive number of computing resources.

In an embodiment, the maximum recursion depth may include three, four, or five layers, or the like.

In addition, in this embodiment of the present disclosure, in the process of recursively traversing the migration storage positions, different recursive traversal algorithms may be adopted based on configuration.

In an embodiment, the recursive traversal algorithm may include a breadth-first traversal algorithm or a depth-first traversal algorithm.

The breadth-first traversal algorithm prioritizes migration attempts for conflicting MAC addresses at a same level. The depth-first traversal algorithm prioritizes migration attempts for a same conflicting MAC address at multiple levels.

In this embodiment of the present disclosure, a storage position of the currently to-be-stored MAC address entry in each storage block may be called a first storage position, and a conflicting MAC address stored at the first storage position may be called a first conflicting MAC address entry; a storage position of the first conflicting MAC address entry in each storage block may be called a second storage position, and a conflicting MAC address stored at the second storage position may be called a second conflicting MAC address entry, and so on.

For the breadth-first traversal algorithm, in a case where it is determined that the first conflicting MAC address entry is stored at each first storage position, each second storage position is traversed to see whether a second conflicting MAC address is stored, in a case where the second conflicting MAC address is stored at each second storage position, each third storage position is traversed to see whether a third conflicting MAC address is stored, and so on, until a migration storage position is found, or no migration storage position has been found when the maximum recursion depth is reached.

For the depth-first traversal algorithm, in a case where it is determined that the first conflicting MAC address entry is stored at each first storage position, first conflicting MAC addresses may be traversed, for a currently traversed first conflicting MAC address, multiple levels of migration attempts may be performed for the first conflicting address until a migration storage position is found, or in a case where a preset maximum recursion depth is reached and no migration storage position has been found, the traversal of the first conflicting MAC addresses is resumed, and multiple levels of migration attempts are performed for next first conflicting MAC address, and so on, until a migration storage position is found, or no migration storage position has been found after all the first conflicting MAC addresses have been traversed.

Process 140, one or more migration storage positions of one or more first conflicting MAC address entries in the respective storage blocks are found.

Process 150, one of the found migration storage positions is selected and entry migration is performed on the first conflicting MAC address entry corresponding to the selected migration storage position.

Process 160, the MAC address entry is stored at the first storage position corresponding to the migrated first conflicting MAC address entry.

In this embodiment of the present disclosure, in a case where more than one migration storage position of more than one first conflicting MAC address entry in all the storage blocks is found in the above manner, that is, it is determined that one or more first conflicting MAC address entries have one or more migration storage positions in all the storage blocks, one found migration storage position may be selected and entry migration is performed on the first conflicting MAC address entry corresponding to the selected migration storage position.

In this embodiment of the present disclosure, in the process of performing entry migration on the first conflicting MAC address entry corresponding to the selected migration storage position, recursive migration is required to migrate the MAC address entry layer by layer.

For example, the selected migration storage position is the third storage position, there is a need to first migrate the corresponding second conflicting MAC address entry to the third storage position to obtain a free second storage position, then migrate the corresponding first conflicting MAC address to the free second storage position to obtain a free first storage position, and finally store the currently to-be-stored MAC address entry at the free first storage position.

In this embodiment of the present disclosure, when the migration storage position of the first conflicting MAC address entry in all the storage blocks is not found, the currently to-be-stored MAC address entry is discarded.

In the example shown in FIG. 1, for the acquired MAC address entry, first storage positions of the MAC address entry in respective storage blocks are calculated based on hash algorithms of respective hash tables and the MAC address entry. It is determined that a first conflicting MAC address entry is stored at each of the first storage positions. A migration storage position of each of the first conflicting MAC address entries is searched for by traversing the respective storage blocks based on a maximum recursion depth and a preset recursive traversal algorithm. One or more migration storage positions of one or more first conflicting MAC address entries in the respective storage blocks are found. One of the found migration storage positions is selected and entry migration is performed on the first conflicting MAC address entry corresponding to the selected migration storage position. The acquired MAC address entry is stored at the first storage position corresponding to the migrated first conflicting MAC address entry. That is, the storage position of the MAC address entry is no longer "first come first served". Instead, in a case where the currently to-be-stored MAC address entry has a hash collision, a free storage position of the currently to-be-stored MAC address entry is provided by migrating the MAC address entry that has been stored but has another free storage position, and the currently to-be-stored MAC address entry is stored, thereby increasing a storage rate of the MAC address entry.

In order to enable those skilled in the art to better understand the technical solutions provided in the embodiments of the present disclosure, the technical solutions provided in the embodiments of the present disclosure will be described below with reference to specific examples.

To reduce hash collisions in hash tables of MAC addresses, the network apparatus provides a plurality of hash tables to store MAC address entries. Each hash table is stored in a storage block and each storage block is bound to a unique hash algorithm. When adding an MAC address entry, the network apparatus first calculates a hash value of the MAC address entry based on the hash algorithm of the first storage block. When a hash collision occurs in the first storage block, a new hash value is calculated based on the hash algorithm of the second storage block. If a storage position of the second storage block indicated by the new hash value is also occupied, hash calculation may be continued based on the hash algorithm of next storage block, and a free storage position may be searched for recursively. Alternatively, the network apparatus calculates a plurality of hash values based on the bound hash algorithm of each hash table, and start to search a free storage position from the hash table of the first storage block.

Figure 2:
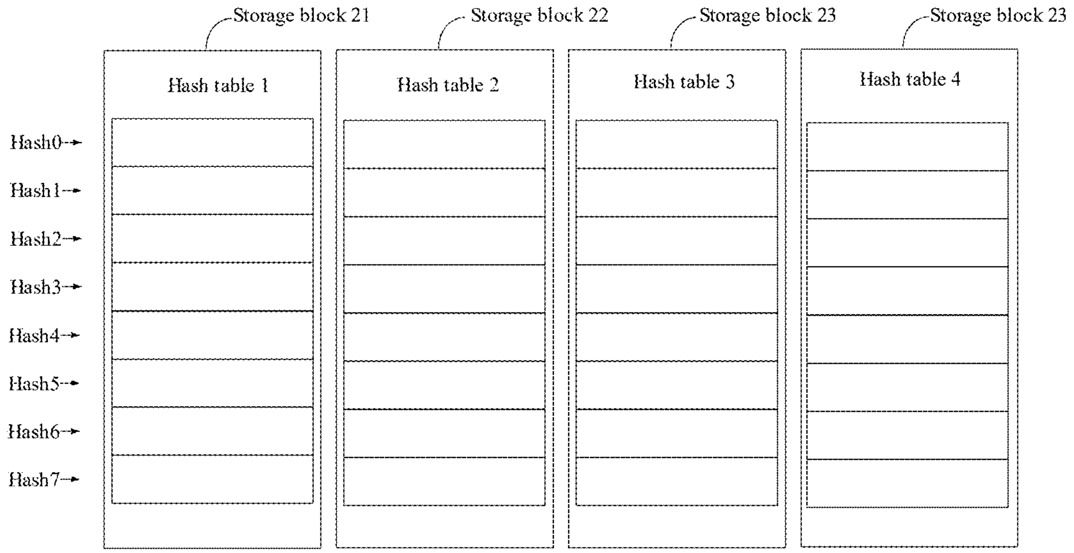
FIG. 2 is a schematic diagram illustrating configurations of hash tables based on an embodiment of the present disclosure.

Taking the configuration of the hash table shown in FIG. 2 as an example, the network apparatus provides 4 hash tables to store an MAC address entry, which are hash tables 1 to 4 respectively, the hash tables 1 to 4 are respectively stored in storage blocks 21 to 24 and are respectively bound to unique hash algorithms which are assumed to be hash algorithms 1 to 4 respectively, and each of the hash tables includes eight storage positions respectively corresponding to different hash values Hash0 to Hash7.

In this embodiment of the present disclosure, the number of storage blocks in the network apparatus and the number of entries recorded in the hash tables of the storage blocks are intended to describe that MAC address entries are evenly stored in a plurality of hash tables in the present disclosure, and are not intended to limit the protection scope of the present disclosure.

For example, when adding a MAC address entry, the network apparatus calculates a plurality of hash values based on the bound hash algorithm of each hash table, and start to search a free storage position from the hash table of the first storage block.

Figure 3A:
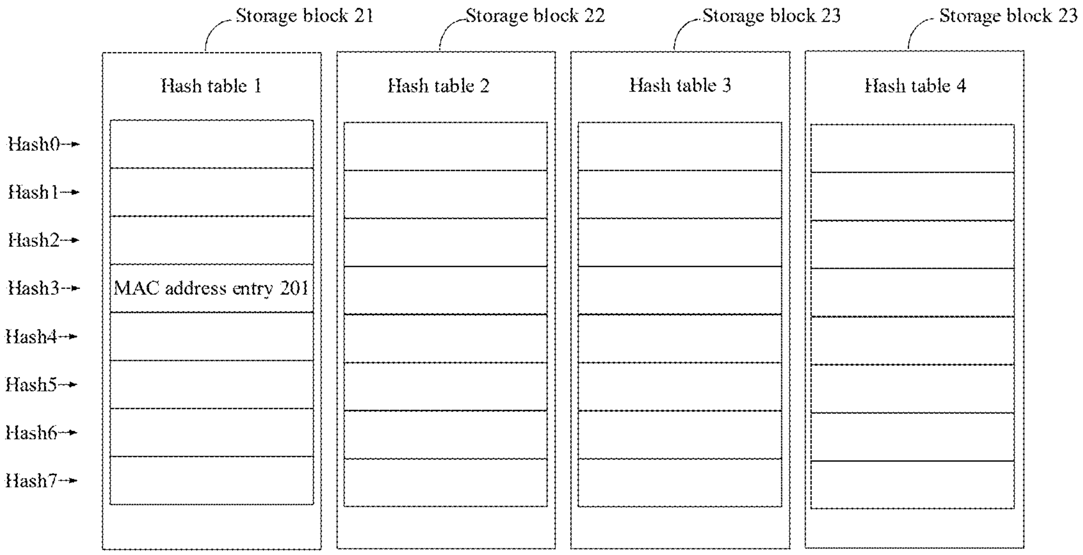
FIG. 3A is a schematic diagram illustrating hash tables after a MAC address entry 201 is stored based on an embodiment of the present disclosure.

Based on the above hash table configuration, in a case where a MAC address entry 201 is stored, hash values indicating storage positions in the hash tables 1 to 4 may be calculated based on a key of the MAC address entry 201 by using the hash algorithms 1 to 4 respectively. Assuming that the hash value indicating the storage position in the hash table 1 is Hash3, since the storage position in the hash table 1 is free, the MAC address entry 201 may be stored at the storage position, and a schematic diagram thereof may be shown in FIG. 3A.

Figure 3B:
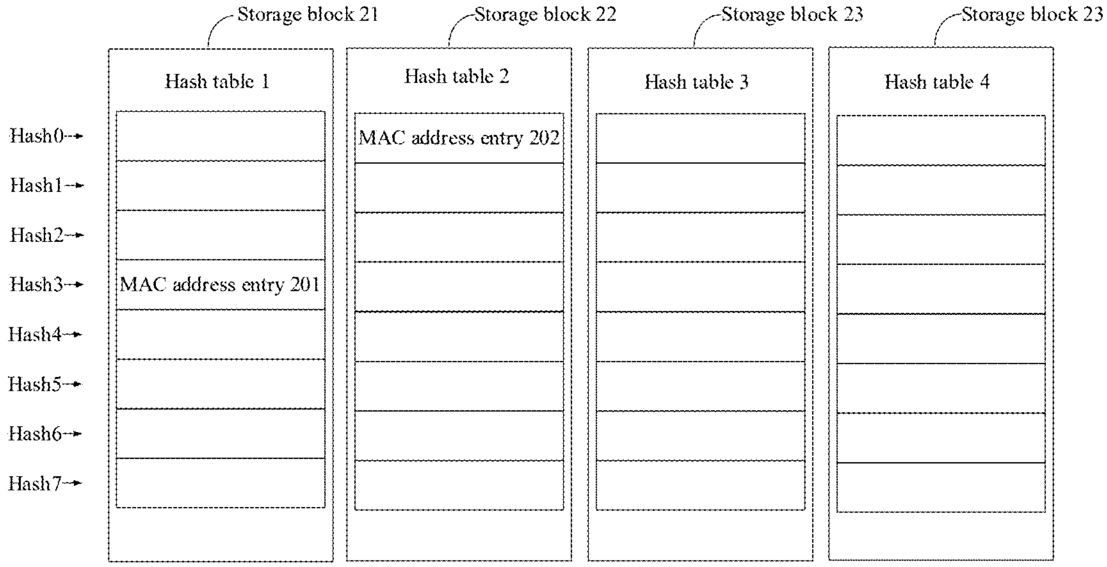
FIG. 3B is a schematic diagram illustrating the hash tables after a MAC address entry 202 is stored based on an embodiment of the present disclosure.

In a case where a MAC address entry 202 is stored, hash values indicating storage positions in the hash tables 1 to 4 may be calculated based on a key of the MAC address entry 202 by using the hash algorithms 1 to 4 respectively. For example, the hash value indicating the storage position in the hash table 1 is Hash3, since the storage position in the hash table 1 is occupied, that is, a hash collision occurs, a free storage position is continuously queried for from the hash table 2. For example, the hash value indicating the storage position in the hash table 2 is Hash0, since the storage position in the hash table 2 is free, the MAC address entry 202 may be stored at the storage position, and a schematic diagram thereof may be shown in FIG. 3B. Based on the configuration of the hash table shown in FIG. 2, implementation of the method for storing MAC address entries provided in the embodiments of the present disclosure will be described below.

A position ij is a position indicated by Hash value j in the hash table i. For example, a position 12 is a position indicated by Hash value 2 in the hash table 1.

In the following, for example, the maximum recursion depth is 3 layers.

For example, a MAC address entry 400 is learned, hash values indicating storage positions in the hash tables 1 to 4 may be calculated based on a key of the MAC address entry 400 by using the hash algorithms 1 to 4 respectively.

For example, the hash values calculated based on the key of the MAC address entry 400 by using the hash algorithms 1 to 4 are Hash2 to Hash5 respectively, and the storage positions indicated by the hash values in the corresponding hash tables are all occupied, that is, position 12, position 23, position 34, and position 45 are all occupied.

In this case, there is a need to determine whether the MAC address entries stored at the position 12, the position 23, the position 34, and the position 45 may be migrated to other storage positions.

Migration attempts for MAC address entries may be performed based on the configuration by breadth-first traversal or depth-first traversal.

Implementation of the migration attempts for MAC address entries by breadth-first traversal is described below.

The position 12, the position 23, the position 34, and the position 45 may be traversed.

For example, the MAC address entry stored at the position 12 is a MAC address entry 301. Hash values indicating storage positions in the hash tables 1 to 4 may be calculated based on a key of the MAC address entry 301 by using the hash algorithms 1 to 4 respectively.

For example, the hash values calculated based on the key of the MAC address entry 301 by using the hash algorithms 1 to 4 are Hash2 and Hash4 to Hash6 respectively, and the position 12, the position 24, the position 35, and the position 46 are all occupied. That is, no migration storage position has been found for the MAC address entry 301 in current-level recursion.

The position 23, the position 34, and the position 45 are continuously traversed.

For example, a MAC address entry stored at the position 23 is a MAC address entry 302, hash values indicating storage positions in the hash tables 1 to 4 may be calculated based on a key of the MAC address entry 302 by using the hash algorithms 1 to 4 respectively.

For example, no migration storage position has been found for the MAC address entry 302 in current-level recursion.

The position 34 and 45 are continuously traversed.

For example, a MAC address entry stored at the position 34 is a MAC address entry 303, hash values indicating storage positions in the hash tables 1 to 4 may be calculated based on a key of the MAC address entry 303 by using the hash algorithms 1 to 4 respectively.

For example, no migration storage position has been found for the MAC address entry 303 in current-level recursion.

The position 45 is continuously traversed.

For example, a MAC address entry stored at the position 45 is a MAC address entry 304, hash values indicating storage positions in the hash tables 1 to 4 may be calculated based on a key of the MAC address entry 304 by using the hash algorithms 1 to 4 respectively.

For example, no migration storage position has been found in current-level recursion based on the MAC address entry 304.

So far, the second layer recursive traversal has been completed, and no migration storage position has been found.

During the third layer recursive traversal, the position 24, the position 35, and the position 46 may be traversed to determine whether the MAC address entries stored in these positions can be migrated.

For example, a MAC address entry stored at the position 46 is a MAC address entry 305, hash values indicating storage positions in the hash tables 1 to 4 may be calculated based on a key of the MAC address entry 305 by using the hash algorithms 1 to 4 respectively.

For example, the hash values calculated based on the key of the MAC address entry 305 by using the hash algorithms 1 to 4 are Hash0, Hash2, Hash3, and Hash6 respectively, and the storage positions indicated are the position 10, the position 22, the position 33, and the position 46 respectively.

Figure 4A:
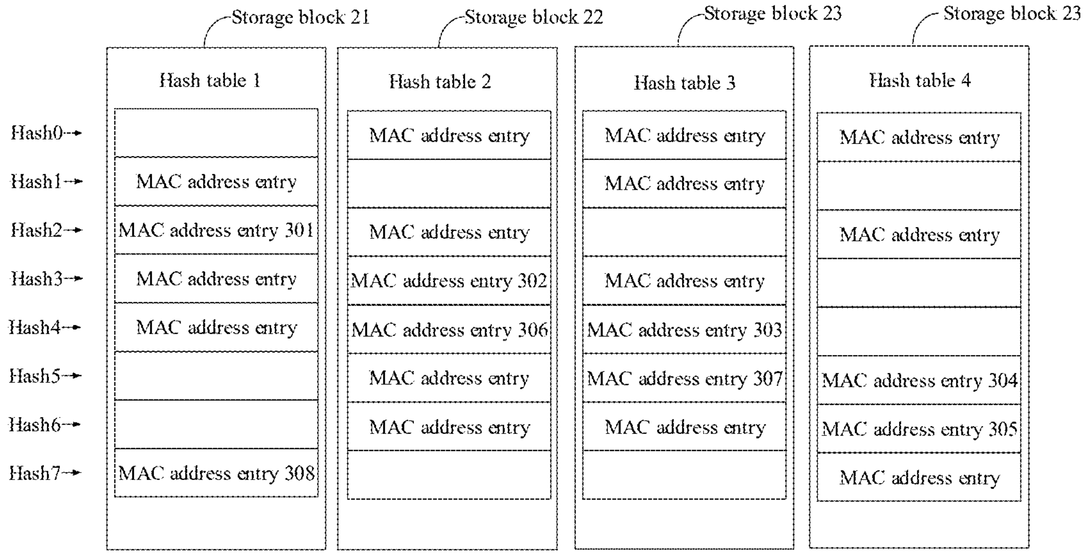
FIG. 4A is a schematic diagram illustrating the hash tables before migration of MAC address entries based on an embodiment of the present disclosure.
Figure 4B:
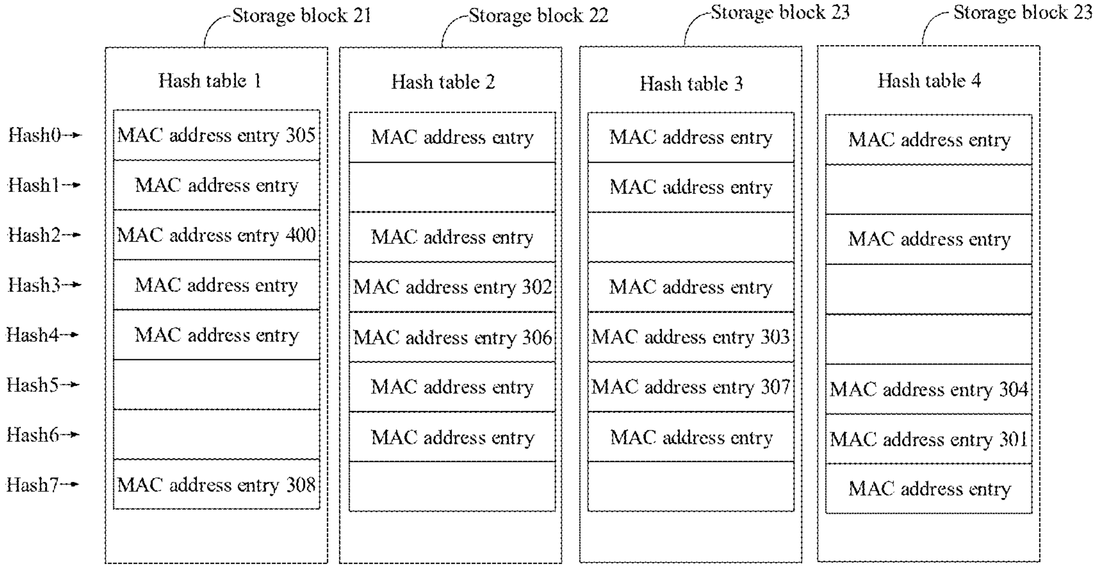
FIG. 4B is a schematic diagram illustrating the hash tables after migration of MAC address entries based on an embodiment of the present disclosure.

For example, the position 10 is a free storage position, the MAC address entry 305 may be migrated from the position 46 to the position 10, the MAC address entry 301 may be migrated from the position 12 to the position 46, and the MAC address entry 400 is stored at the position 12. Schematic diagrams of hash tables before and after MAC address migration may be shown in FIG. 4A and FIG. 4B respectively.

For example, no migration storage position has been found in a case where the third layer recursive traversal is completed, it is determined that storage of the MAC address entry 400 fails.

Implementation of the migration attempts for MAC address entries by depth-first traversal is described below.

Firstly, hash values indicating storage positions in the hash tables 1 to 4 may be calculated based on the key of the MAC address entry 301 by using the hash algorithms 1 to 4 respectively, and the position 12, the position 24, the position 35, and the position 46 are found.

For example, the position 12, the position 24, the position 35, and the position 46 are all occupied. That is, no migration storage position has been found during the second layer recursive traversal for the MAC address entry 301. In this case, the third layer recursive traversal for the MAC address entry 301 may be started to traverse the position 24, the position 35, and the position 46.

A MAC address entry stored at the position 24 is a MAC address entry 306. Hash values indicating storage positions in the hash tables 1 to 4 may be calculated based on a key of the MAC address entry 306 by using the hash algorithms 1 to 4 respectively.

For example, the hash values calculated based on the key of the MAC address entry 306 by using the hash algorithms 1 to 4 are Hash1, Hash4, Hash0, and Hash2 respectively, and the position 11, the position 24, the position 30, and the position 42 are all occupied. That is, no migration storage position has been found for the MAC address entry 306 in current-level recursion.

The position 35 and the position 46 are continuously traversed.

For example, no migration storage position has been found after the position 35 and the position 46 are traversed. That is, no migration storage position has been found during the third layer recursive traversal for the MAC address entry 301.

In this case, the second layer traversal may be resumed to continuously traverse the position 35 and the position 46.

For example, a MAC address entry stored at the position 35 is a MAC address entry 307, hash values indicating storage positions in the hash tables 1 to 4 may be calculated based on a key of the MAC address entry 307 by using the hash algorithms 1 to 4 respectively.

For example, the hash values calculated based on the key of the MAC address entry 307 by using the hash algorithms 1 to 4 are Hash7, Hash6, Hash5, and Hash0 respectively, and position 17, the position 26, the position 35, and the position 40 are all occupied. That is, no migration storage position has been found during the second layer recursive traversal for the MAC address entry 307. In this case, the third layer recursive traversal for the MAC address entry 307 may be started to traverse the position 17, the position 26, and the position 40.

For example, a MAC address entry stored at the position 17 is a MAC address entry 308, hash values obtained by hash calculation based on a key of the MAC address entry 308 by using the hash algorithms 1 to 4 are Hash7, Hash5, Hash6, and Hash1 respectively.

Figure 4C:
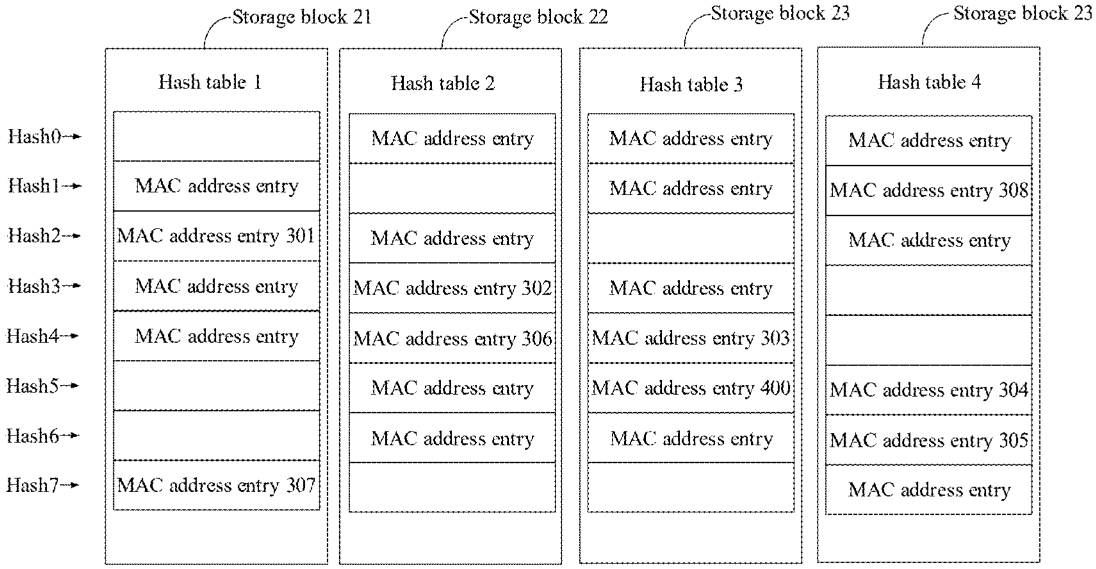
FIG. 4C is a schematic diagram illustrating the hash tables after migration of MAC address entries based on another embodiment of the present disclosure.

For example, the position 41 is a free storage position, the MAC address entry 308 may be migrated from the position 17 to the position 41, the MAC address entry 307 may be migrated from the position 35 to the position 17, and the MAC address entry 400 is stored at the position 35. Schematic diagrams of hash tables before and after MAC address migration may be shown in FIG. 4A and FIG. 4C respectively.

In this embodiment of the present disclosure, the network apparatus may count a storage rate of the hash table of each storage block and a total storage rate of the hash tables of all the storage blocks. In this way, when a total storage rate of all the storage blocks of the network apparatus exceeds a preset storage rate value, the network apparatus performs the above embodiments to store the MAC address entry.

The network apparatus performing the above embodiments may not discard the learned MAC address entry just because a hash collision occurs in each hash table, which improves efficiency of storage of the MAC address entry and also improves efficiency of storage of each hash table.

Figure 5:
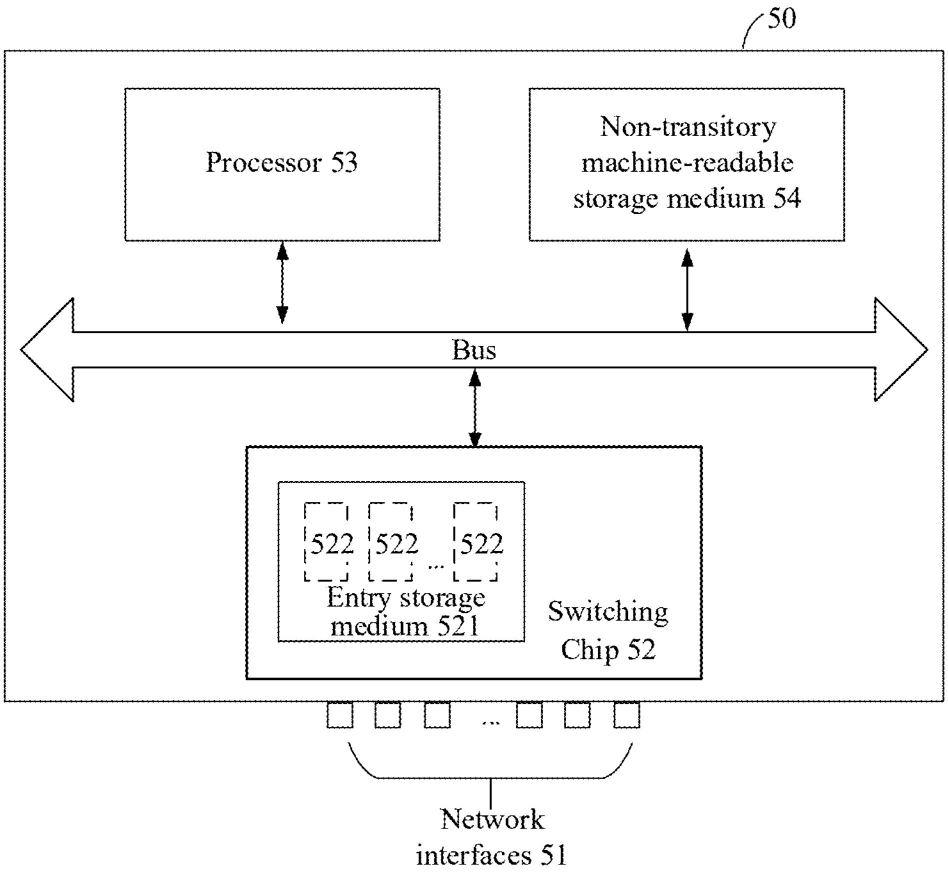
FIG. 5 is a schematic diagram illustrating an apparatus for storing MAC address entries based on the present disclosure.

FIG. 5 is a schematic diagram illustrating an apparatus for storing MAC address entries based on the present disclosure. An apparatus 50 includes a plurality of network interfaces 51, a switching apparatus 52 having a plurality of storage blocks, a processor 53, and a non-transitory machine-readable storage medium 54 recording processor-executable instructions. Each storage block of the switching apparatus stores a hash table and is provided with a unique hash algorithm.

The switching apparatus 52 may be implemented by hardware (e.g., a process of an application specific integrated circuit (ASIC)), or implemented by a combination of software and hardware, which is not specifically limited in this embodiment of the present disclosure.

For example, the switching apparatus 52 may be a switching chip, and the switching chip may include an entry storage medium 521. A plurality of storage blocks 522 may be stored in the entry storage medium 521. Each storage block 522 stores a hash table and is provided with a unique hash algorithm.

The switching apparatus 52 learns MAC address entries based on an Ethernet message received by any one of the network interfaces 51.

The processor 53 executes the processor-executable instructions recorded by the non-transitory machine-readable storage medium 54 to perform operations including: acquiring the learned MAC address entry; calculating first storage positions of the MAC address entry in respective storage blocks based on hash algorithms of respective hash tables and the MAC address entry; determining that a first conflicting MAC address entry is stored at each of the first storage positions; searching for a migration storage position of each of the first conflicting MAC address entries by traversing the respective storage blocks based on a maximum recursion depth and a preset recursive traversal algorithm; finding one or more migration storage positions of one or more first conflicting MAC address entries in the respective storage blocks; selecting one of the found migration storage positions and performing entry migration on the first conflicting MAC address entry corresponding to the selected migration storage position; and storing the MAC address entry at the first storage position corresponding to the migrated first conflicting MAC address entry.

In an example, the processor 53 executes the processor-executable instructions recorded by the non-transitory machine-readable storage medium 54 to further perform the operations further including: in response to a determination that no migration storage position is found for any of the first conflicting MAC address entries in the respective storage blocks, discarding the MAC address entry.

In an example, the preset recursive traversal algorithm is a breadth-first traversal algorithm; and the searching for a migration storage position of each of the first conflicting MAC address entries by traversing the respective storage blocks based on the maximum recursion depth and the preset recursive traversal algorithm includes: calculating second storage positions corresponding to the first conflicting MAC address entries in the respective storage blocks based on the hash algorithms of the respective hash table and the first conflicting MAC address entries; traversing the second storage positions; in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, searching for a migration storage position of each of the second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing the selected second conflicting MAC address entry.

In an example, the preset recursive traversal algorithm is a depth-first traversal algorithm; and the searching for a migration storage position of each of the first conflicting MAC address entries by traversing the respective storage blocks based on the maximum recursion depth and the preset recursive traversal algorithm includes: traversing the first conflicting MAC address entries; calculating second storage positions of the currently traversed first conflicting MAC address entries in the respective storage blocks; in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, traversing the second conflicting MAC address entries, searching for a migration storage position of each of the currently traversed second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing the selected second conflicting MAC address entry.

In an example, the processor 53 executes the processor-executable instructions recorded by the non-transitory machine-readable storage medium 54 to further perform the operations further including: when no migration storage position is found for any of the currently traversed second conflicting MAC address entries is not found and the number of recursion layers reaches the maximum recursion depth, continuously traversing the second conflicting MAC address entries; when all of the second conflicting MAC address entries have been traversed and no migration storage position is found, continuously traversing the first conflicting MAC address entries; and when the migration storage position of any of the currently traversed second conflicting MAC address entries is not found and the number of recursion layers does not reach the maximum recursion depth, searching for a next-level migration storage position of each of the currently traversed second conflicting MAC address entries.

The present disclosure further provides a non-transitory machine-readable storage medium recording processor-executable instructions, for example, the non-transitory machine-readable storage medium 54 in FIG. 5. The processor-executable instructions may be executed by the processor 53 in the apparatus for storing MAC address entries in FIG. 5 to implement the method for storing MAC address entries as described above.

Other implementation solutions of the present disclosure will be apparent to those skilled in the art after consideration of the specification and practice of the present disclosure. The present disclosure is intended to cover any variations, uses, or adaptations of the present disclosure following the general principles of the present disclosure and including common knowledge or common technical means in the art not disclosed in the present disclosure. The specification and embodiments are considered as exemplary only, and a true scope and spirit of the present disclosure are indicated by the appended claims.

The invention claimed is:

1. A method for storing media access control (MAC) address entries, comprising:

acquiring a learned MAC address entry;

calculating first storage positions of the MAC address entry in respective storage blocks based on hash algorithms of respective hash tables and the MAC address entry;

determining that a first conflicting MAC address entry is stored at each of the first storage positions;

searching for a migration storage position of each of the first conflicting MAC address entries by traversing the respective storage blocks based on a maximum recursion depth and a preset recursive traversal algorithm;

finding one or more migration storage positions of one or more first conflicting MAC address entries in the respective storage blocks;

selecting one of the found migration storage positions and performing entry migration on the first conflicting MAC address entry corresponding to the selected migration storage position; and storing the MAC address entry at the first storage position corresponding to the migrated first conflicting MAC address entry.

2. The method of claim 1, further comprising:

in response to a determination that no migration storage position is found for any of the first conflicting MAC address entries in the respective storage blocks, discarding the MAC address entry.

3. The method of claim 1, wherein the preset recursive traversal algorithm is a breadth-first traversal algorithm; and the searching for a migration storage position of each of the first conflicting MAC address entries by traversing the respective storage blocks based on the maximum recursion depth and the preset recursive traversal algorithm comprises:

calculating second storage positions corresponding to the first conflicting MAC address entries in the respective storage blocks based on the hash algorithms of the respective hash table and the first conflicting MAC address entries;

traversing the second storage positions;

in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, searching for a migration storage position of each of the second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

4. The method of claim 1, wherein the preset recursive traversal algorithm is a depth-first traversal algorithm; and the searching for a migration storage position of each of the first conflicting MAC address entries by traversing the respective storage blocks based on the maximum recursion depth and the preset recursive traversal algorithm comprises:

traversing the first conflicting MAC address entries;

calculating second storage positions of the currently traversed first conflicting MAC address entries in the respective storage blocks;

in response to determining that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, traversing the second conflicting MAC address entries, searching for a migration storage position of each of the currently traversed second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

5. The method of claim 4, further comprising:

when no migration storage position is found for any of the currently traversed second conflicting MAC address entries and the number of recursion layers reaches the maximum recursion depth, continuously traversing the second conflicting MAC address entries; when all of the second conflicting MAC address entries have been traversed and no migration storage position is found, continuously traversing the first conflicting MAC address entries; and when no migration storage position is found for any of the currently traversed second conflicting MAC address entries and the number of recursion layers does not reach the maximum recursion depth, searching for a next-level migration storage position of each of the currently traversed second conflicting MAC address entries.

6. An apparatus for storing media access control (MAC) address entries, comprising: a plurality of network interfaces, a switching apparatus having a plurality of storage blocks, a processor, and a non-transitory machine-readable storage medium recording processor-executable instructions; wherein each of the plurality of storage blocks of the switching apparatus stores a hash table and is provided with a unique hash algorithm;

the switching apparatus is configured to learn a MAC address entry based on an Ethernet message received by any one of the plurality of network interfaces; and the processor is configured to execute the processor-executable instructions recorded by the non-transitory machine-readable storage medium to perform operations comprising:

acquiring the learned MAC address entry;

calculating first storage positions of the MAC address entry in respective storage blocks based on hash algorithms of respective hash tables and the MAC address entry;

determining that a first conflicting MAC address entry is stored at each of the first storage positions;

searching for a migration storage position of each of the first conflicting MAC address entries by traversing the respective storage blocks based on a maximum recursion depth and a preset recursive traversal algorithm;

finding one or more migration storage positions of one or more first conflicting MAC address entries in the respective storage blocks;

selecting one of the found migration storage positions and performing entry migration on the first conflicting MAC address entry corresponding to the selected migration storage position; and storing the MAC address entry at the first storage position corresponding to the migrated first conflicting MAC address entry.

7. The apparatus of claim 6, wherein the processor is configured to execute the processor-executable instructions recorded by the non-transitory machine-readable storage medium to perform the operations further comprising:

in response to a determination that no migration storage position is found for any of the first conflicting MAC address entries in the respective storage blocks, discarding the MAC address entry.

8. The apparatus of claim 6, wherein the preset recursive traversal algorithm is a breadth-first traversal algorithm; and searching for the migration storage position of each of the first conflicting MAC address entries by traversing the respective storage blocks based on the maximum recursion depth and the preset recursive traversal algorithm comprises:

calculating second storage positions corresponding to the first conflicting MAC address entries in the respective storage blocks based on the hash algorithms of the respective hash tables and the first conflicting MAC address entries;

traversing the second storage positions;

in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, searching for a migration storage position of each of the second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

9. The apparatus of claim 6, wherein the preset recursive traversal algorithm is a depth-first traversal algorithm; and searching for the migration storage position of each of the first conflicting MAC address entries by traversing the respective storage blocks based on the maximum recursion depth and the preset recursive traversal algorithm comprises:

traversing the first conflicting MAC address entries;

calculating second storage positions of the currently traversed first conflicting MAC address entries in the respective storage blocks;

in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, traversing the second conflicting MAC address entries, searching for a migration storage position of each of the currently traversed second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

10. The apparatus based on claim 9, wherein the processor is configured to execute the processor-executable instructions recorded by the non-transitory machine-readable storage medium to perform the operations further comprising:

when no migration storage position is found for any of the currently traversed second conflicting MAC address entries and the number of recursion layers reaches the maximum recursion depth, continuously traversing the second conflicting MAC address entries; when all of the second conflicting MAC address entries have been traversed and no migration storage position is found, continuously traversing the first conflicting MAC address entries; and when no migration storage position is found for any of the currently traversed second conflicting MAC address entries is not found and the number of recursion layers does not reach the maximum recursion depth, searching for a next-level migration storage position of each of the currently traversed second conflicting MAC address entries.

11. A non-transitory machine-readable storage medium, storing instructions thereon, wherein the instructions, when executed by a processor, cause the processor to perform operations comprising:

acquiring a learned media access control (MAC) address entry;

calculating first storage positions of the MAC address entry in respective storage blocks based on hash algorithms of respective hash tables and the MAC address entry;

determining that a first conflicting MAC address entry is stored at each of the first storage positions;

searching for a migration storage position of each of the first conflicting MAC address entries by traversing the respective storage blocks based on a maximum recursion depth and a preset recursive traversal algorithm;

finding one or more migration storage positions of one or more first conflicting MAC address entries in the respective storage blocks;

selecting one of the found migration storage positions and performing entry migration on the first conflicting MAC address entry corresponding to the selected migration storage position; and storing the MAC address entry at the first storage position corresponding to the migrated first conflicting MAC address entry.

12. The non-transitory machine-readable storage medium of claim 11, wherein the operations further comprise:

in response to a determination that no migration storage position is found for any of the first conflicting MAC address entries in the respective storage blocks, discarding the MAC address entry.

13. The non-transitory machine-readable storage medium of claim 11, wherein the preset recursive traversal algorithm is a breadth-first traversal algorithm; and the searching for a migration storage position of each of the first conflicting MAC address entries by traversing the respective storage blocks based on the maximum recursion depth and the preset recursive traversal algorithm comprises:

calculating second storage positions corresponding to the first conflicting MAC address entries in the respective storage blocks based on the hash algorithms of the respective hash table and the first conflicting MAC address entries;

traversing the second storage positions;

in response to a determination that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, searching for a migration storage position of each of the second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

14. The non-transitory machine-readable storage medium of claim 11, wherein the preset recursive traversal algorithm is a depth-first traversal algorithm; and the searching for a migration storage position of each of the first conflicting MAC address entries by traversing the respective storage blocks based on the maximum recursion depth and the preset recursive traversal algorithm comprises:

traversing the first conflicting MAC address entries;

calculating second storage positions of the currently traversed first conflicting MAC address entries in the respective storage blocks;

in response to determining that there is a free storage position in the second storage positions, determining the free storage position as the migration storage position of the first conflicting MAC address entry corresponding to the free storage position; and in response to a determination that a second conflicting MAC address entry is stored at each of the second storage positions and a number of recursion layers does not reach the maximum recursion depth, traversing the second conflicting MAC address entries, searching for a migration storage position of each of the currently traversed second conflicting MAC address entries by traversing the respective storage blocks, finding one or more migration storage positions of one or more second conflicting MAC address entries in the respective storage blocks, and selecting one of the found migration storage positions of the second conflicting MAC address entries as the migration storage position of the first conflicting MAC address entry corresponding to the second storage position storing a second conflicting MAC address entry which corresponds to the selected storage position.

15. The non-transitory machine-readable storage medium of claim 14, wherein the operations further comprise:

when no migration storage position is found for any of the currently traversed second conflicting MAC address entries and the number of recursion layers reaches the maximum recursion depth, continuously traversing the second conflicting MAC address entries; when all of the second conflicting MAC address entries have been traversed and no migration storage position is found, continuously traversing the first conflicting MAC address entries; and when no migration storage position is found for any of the currently traversed second conflicting MAC address entries and the number of recursion layers does not reach the maximum recursion depth, searching for a next-level migration storage position of each of the currently traversed second conflicting MAC address entries.

* * * * *